United States Patent [19]
Ayres

[11] 3,856,904
[45] Dec. 24, 1974

[54] PROCESS FOR MAKING EXPANDED SYNTHETIC RESINOUS BEADS

[75] Inventor: Ralph E. Ayres, Midland, Mich.

[73] Assignee: The Dow Chemical Company, Midland, Mich.

[22] Filed: Oct. 19, 1973

[21] Appl. No.: 408,241

Related U.S. Application Data

[63] Continuation of Ser. No. 162,252, July 13, 1971, abandoned, which is a continuation-in-part of Ser. No. 31,747, April 24, 1970, abandoned.

[52] U.S. Cl............... 264/51, 161/168, 260/2.5 B, 264/5, 264/53, 264/141
[51] Int. Cl........................ B29d 27/00, B29f 3/04
[58] Field of Search.......... 264/51, 53, 5, 141, 142; 161/168; 260/2.5 B

[56] References Cited
UNITED STATES PATENTS

| | | | |
|---|---|---|---|
| 2,576,977 | 12/1951 | Stober | 264/53 X |
| 3,003,193 | 10/1961 | Chisholm et al. | 264/54 X |
| 3,607,596 | 9/1971 | Fairbanks | 156/244 X |

Primary Examiner—Philip E. Anderson
Attorney, Agent, or Firm—Robert B. Ingraham

[57] ABSTRACT

Expandable; that is, prefoamed, resinous particles are prepared by intermittent extrusion of a foamable material to form chains of beads or particles and subsequently breaking the chains into individual particles by mild mechanical agitation.

8 Claims, 1 Drawing Figure

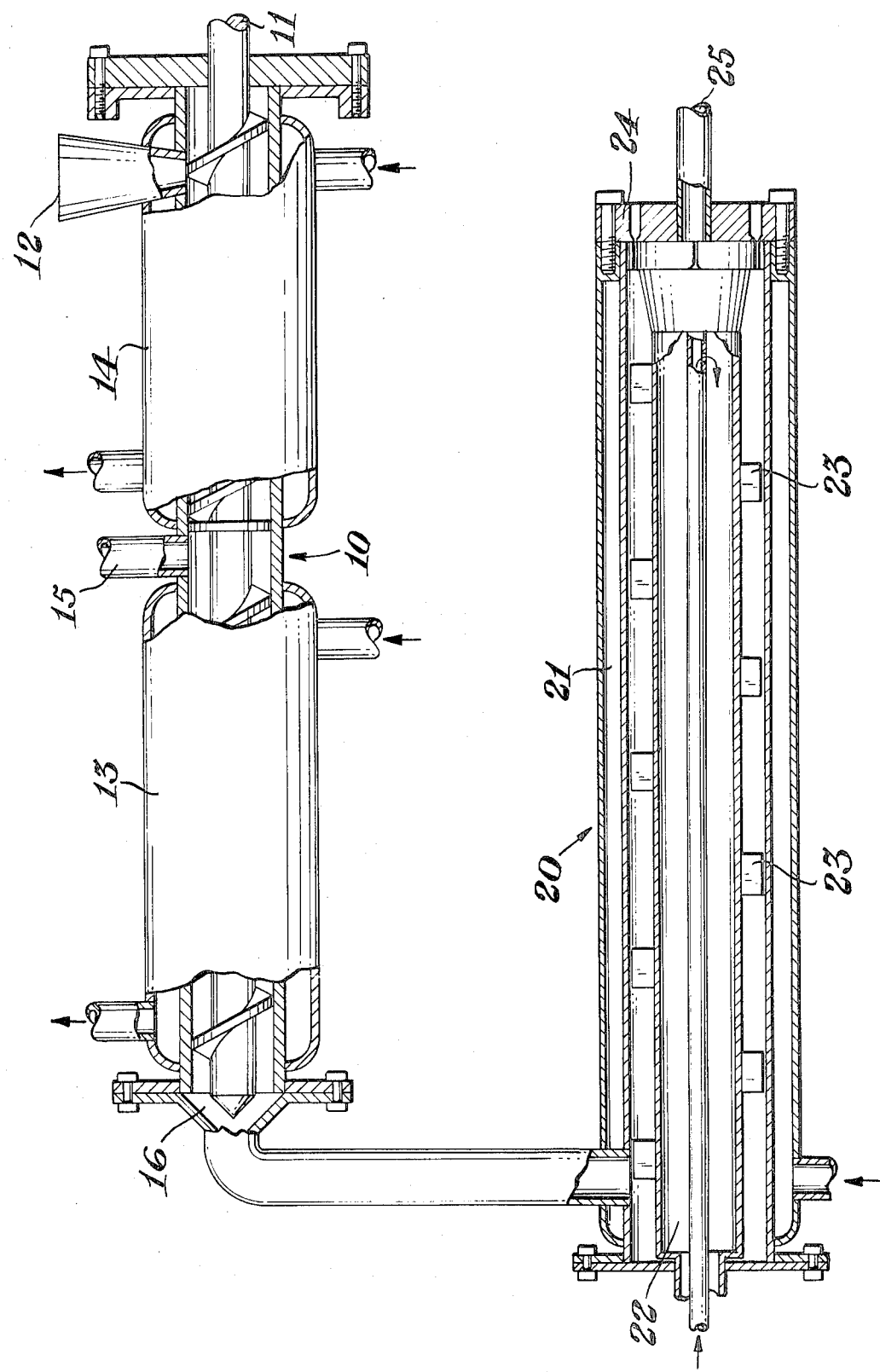

PROCESS FOR MAKING EXPANDED SYNTHETIC RESINOUS BEADS

This application is a continuation-in-part of my copending application Ser. No. 162,252 filed July 13, 1971 and now abandoned, which in turn is a continuation-in-part of Ser. No. 31,747, filed Apr. 24, 1970 now abandoned.

Expanded synthetic resinous granules are frequently employed for molding foamed plastic articles. Oftentimes, such foamed plastic articles are prepared by initially prefoaming a mass of solid expandable particles, placing the preformed particles in a closed mold, subjecting the particles to conditions sufficient to cause further expansion and knitting together of the particles to form a unitary body. For example: partially expanded polystyrene beads are employed to fill a closed mold, the mold having perforate walls, injecting low pressure steam, such as steam at 10 to 15 pounds per square inch gauge, into the mold, causing the particles to expand and knit together. Desirably, such particles are prepared with a minimum expenditure of time and labor. The most common form of expandable particles are those which are produced and prepared in the unexpanded form, partially expanded and subsequently molded.

Various methods have been employed for the preparation of partially expanded particles such as are set forth in U.S. Pat. Nos. 2,576,977 and 3,003,193, both of these patents being incorporated herein by reference.

In U.S. Pat. No. 3,003,193, partially expanded beads of thermoplastic polymers are prepared by the intermittent extrusion of small quantities of expandable thermoplastic composition into a channel, and subsequently introducing a non-reactive fluid into the channel to eject the particles, and repeating the process. The channel receives the particle; the particle is ejected; another particle is received, etc. The apparatus of U.S. Pat. No. 3,003,193 in essence comprises a fixed perforate die, a rotating shearing or cutting member having a plurality of openings corresponding to openings in the fixed perforate die, and as the rotating member rotates, the openings register with the perforations in the fixed die. Thus, as the rotating member rotates, a plurality of small bodies of foamable material pass into the die. Intermittent between each of the polymer supply openings and rotating member is a non-reactive fluid supply channel which serves to eject the extruded particle. Such a non-reactive fluid may be steam, air or the like. For purposes of reference, such a system may be considered to be a two-fluid system; the first fluid being the foamable extrude, and the second fluid being the ejecting fluid. The use of the ejecting fluid frequently requires pre-heating the fluid, and in instances where steam or water are employed as the ejecting fluid, subsequent drying of the beads is often necessary as is close temperature control of the ejecting fluid. The use of the ejecting fluid introduces still one more process variable which must be controlled.

The present invention provides an improved method for the preparation of foamed beads of a synthetic resinous thermoplastic material in that the requirement for the ejecting fluid in the method of U.S. Pat. No. 3,003,193 is limited. The present invention is an improvement in a method for making molding granules in the form of beads from a synthetic thermoplastic resin which comprises intermittently extruding a heat plastified normally solid resinous composition comprising a synthetic thermoplastic resinous polymer under continuously applied pressure through a plurality of constricted passageways by a valving means into a plurality of open outlets in a zone of lower pressure wherein sequentially extruded globules of said resinous composition expand and adhere together to form a strand, the strand consisting essentially of a plurality of particles adhered together, and subsequently applying mechanical agitation to said strands sufficient to separate the strands into individual particles.

The method can be employed for making beads of expandable or foamable, extrudable thermoplastic substances; i.e., organic plastics, such as cellulose ethers, cellulose esters and normally solid thermoplastic polymers and copolymers of vinyl and vinylidene compounds or compositions comprising such thermoplastic polymers and copolymers; e.g., plasticized or pigmented polymers and copolymers of vinyl and vinylidene compounds. The method is advantageously used for making beads of thermoplastic alkenyl aromatic resins and moldable compositions comprising the thermoplastic alkenyl aromatic resins having a small proportion of a plasticizer or one or more volatile organic compounds incorporated therewith, which volatile organic compound is capable of foaming the resin to form a cellular product upon heating of the beads of the composition to a temperature above its softening point and above the boiling point of the volatile organic compound.

By an "alkenyl aromatic resin" is meant a solid polymer of one or more polymerizable alkenyl aromatic compounds. Such polymer comprises in chemically combined form at least 50 percent by weight of at least one alkenyl aromatic compound having the general formula

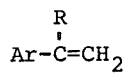

wherein Ar represents an aromatic hydrocarbon radical or a halohydrocarbon radical of the benzene series, and R is hydrogen or the methyl radical. Examples of such alkenyl aromatic resins are the solid homopolymers of styrene, vinyltoluene, vinylxylene, isopropylstyrene, tert-butylstyrene, ar-chlorostyrene or ar-dichlorostyrene; the solid copolymers of two or more of such alkenyl aromatic compounds with one another; and solid copolymers of one or more of such alkenyl aromatic compounds with minor amounts of other readily copolymerizable olefinic compounds such as methyl methacrylate or acrylonitrile; and copolymers of the monoalkenyl aromatic compounds and natural or a synthetic rubber; e.g., copolymers of styrene with from 2 to 15 percent by weight of a synthetic rubbery copolymer of butadiene and styrene.

The method herein described is particularly useful for making foamable beads of compositions comprising a thermoplastic alkenyl aromatic resin having a small proportion of a volatile organic compound incorporated therewith. Such compositions consist essentially of the alkenyl aromatic resin having from 0.05 to 0.3 gram molecular proportion of a volatile organic compound such as a saturated aliphatic hydrocarbon or a perchlorofluorocarbon having a molecular weight of at least 58 and boiling at a temperature below 95° C., per 100 grams of the polymer, uniformly incorporated therewith and are normally solid materials at ordinary temperatures and pressures. Example of suitable volatile organic compounds that can be incorporated under pressure with the alkenyl aromatic resins to form compositions which can be made into beads by the method of the invention are saturated aliphatic hydrocarbons such as butane, pentane, isopentane, neopentane, hexane, heptane or saturated aliphatic or cyclic perchlorofluorocarbons. Examples of suitable perchlorofluorocarbons are:

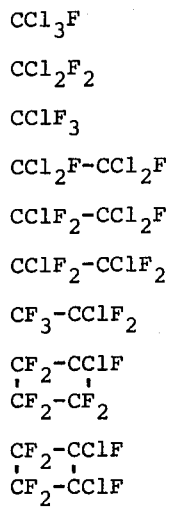

Mixtures of any two or more of such volatile organic compounds can also be used.

Mechanical separation of the strands into individual particles is readily accomplished by a wide variety of means, including subjecting the strands to an agitator in a vessel such as a crowfoot agitator in a cylindrical drum, tumbling within a drum. One particularly desirable method is subjecting the strands to a turbulent gas stream, such as air, with or without mechanical agitation. Such a gas stream may be readily provided by feeding the strands directly or indirectly from extrusion apparatus into a centrifugal blower which beneficially may be employed to transport the foamed particles to a desired location. Use of a centrifugal blower to provide mechanical agitation combines the function of transport with the separation of particles. The individual particles forming the strand are relatively weakly adhered together, probably in part because of the cooling effect during expansion or foaming. In accordance with the present invention, generally pre-expanded particles are prepared which have a lower bulk density than particles which generally are obtained in accordance with the process of U.S. Pat. No. 3,003,193.

A plurality of runs are made employing an electrically heated 2½ inch National Rubber Machinery extruder which discharges into a modified 3½ inch National Rubber Machinery oil-heated extruder. The oil-heated extruder is modified by removing the conventional extrusion screw and replacing it with a hollow bar having paddles or projections (generally similar to the projections of U.S. Pat. No. 2,669,751, herewith incorporated by reference) running generally parallel to the axis of rotation of the bar which replaces the screw. A blowing agent mixture is pumped into the melting and mixing zone of the 2½ inch extruder by means of a constant displacement pump. The discharge of the 3½ inch extruder is fitted with a 3 inch cutter as depicted in U.S. Pat. No. 3,003,193 which has 28 holes. A rotating plate is affixed to the bar substituted for the screw and operating adjacent the die has 51 slots. The operation of the discharge of the oil-heated extruder differs from that depicted in U.S. Pat. No. 3,003,193 in that no fluid under pressure other than the heat plastified polymer is supplied to the die assembly.

The apparatus is schematically depicted in the FIGURE wherein the 2.5 inch extruder is generally designated by the reference numeral 10. The extruder 10 has a driven or forwarding screw 11, temperature control jackets 13 and 14 and a blowing agent inlet 15. The extruder 10 has a discharge end 16 which is in communication with a 3.5 inch extruder generally designated by the reference numeral 20. The extruder 20 has a heat exchange jacket 21 and a rotor or hollow bar 22 having a plurality of paddles or projections 23 on the outer surface thereof. Optionally, heated streams of fluid may be provided to the rotor 22. The 3.5 inch extruder has a die assembly 24 having a fluid or gas inlet 25 which is not used. Molding grade polystyrene is fed to the 2½ inch extruder by means of a weight feeder. Solid additives such as barium stearate, magnesium oxide and finely divided calcium silicate are added as a concentrate by a second weight feeder. The material discharging from the 3½ inch extruder is passed to a centrifugal blower through a conduit and subsequently into a collection bin. Blowing agent fed to the 2½ inch extruder is at least 28 weight percent pentane with or without another volatile material. The results are set forth in the Table which follows.

TABLE

| | | | | | | EXTRUSION CONDITIONS | | | | | |
|---|---|---|---|---|---|---|---|---|---|---|---|
| | | | | | | PRESSURE | | | GEL TEMPERATURE | | |
| | | | | | Fire | | | | | | |
| Run No. | Blowing Agent-1 | Nucleator 1-1 | BaSt 2-1 | MgO³ | Retardant 4-1 | Exit A **-II | Exit B ***-II | Die II | Exit A **-°C. | Exit B ***-°C. | Die °C. |
| 1 | 13.2 | 0.527 | 0.176 | 0.0056 | 2.2 | 450 | 400 | 300 | 171 | 124 | 126 |
| 2 | 13.5 | 0.527 | 0.176 | 0.0056 | 2.2 | 450 | 400 | 300 | 170 | 124 | 125 |
| 3 | 13.6 | 0.567 | 0.189 | 0.02 | 3.02 | 350 | 350 | 250 | 173 | 121 | 122 |
| 4 | 13.5 | 0.23 | 0.144 | 0.0144 | 2.26 | 400 | 400 | 300 | 171 | 124 | 124 |
| 5 | 12.5 | 0.198 | 0.142 | 0.0142 | 2.26 | 450 | 450 | 300 | 171 | 122 | 122 |
| 6 | 15.0 | 0.170 | 0.142 | 0.0198 | 2.32 | 400 | 400 | 300 | 170 | 122 | 122 |
| 7 | 15.3 | 0.142 | 0.142 | 0.0226 | 2.38 | 350 | 350 | 250 | 168 | 126 | 128 |
| 8-* | 11.8 | 0.142 | 0.142 | 0.0226 | 2.38 | 850 | 700 | 600 | 181 | 127 | 130 |

TABLE—Continued

| Run No. | Cutter III | Density IV | Bead Collection Method | MOLDING CHARACTER | | | MATERIAL PROPERTY | |
|---|---|---|---|---|---|---|---|---|
| | | | | Aged Density IV | Steam Cycle V | Cool Time (min.) | Compressive Strength II | Density IV |
| 1 | 104 | 1.11 | (1) | 1.03 | 12/12 | 9.0 | 8.5 | 1.08 |
| 2 | 88 | 1.11 | (1) | 1.07 | 12/12 | 20.0 | 8.9 | 1.06 |
| 3 | 96 | 1.24 | (2) | 1.03 | 12/12 | 19.2 | 7.5 | 1.02 |
| 4 | 96 | 1.13 | (3) | 1.00 | 12/12 | 12.0 | 7.3 | 1.06 |
| 5 | 96 | 1.13 | (3) | 1.03 | 12/12 | 8.5 | 8.3 | 1.15 |
| 6 | 96 | 1.09 | (3) | 1.02 | 12/12 | 8.0 | 8.9 | 1.15 |
| 7 | 96 | 1.06 | (3) | 1.0 | 12/12 | 9.0 | 7.1 | 1.07 |
| 8-* | 96 | 1.16 | (3) | 1.04 | 12/12 | 31.0 | 8.6 | 1.14 |

\* = extrusion rate increased to 52 pounds per hour
I = parts per hundred
1 = calcium silicate
2 = barium stearate
3 = magnesium oxide
4 = halogenated fire retarding agent
II = per square inch
III = revolutions per minute
IV = pounds per cubic foot
(1) = screen bin; cold air purge
(2) = closed bin; no air purge
(3) = enclosed bin; warm air purge
\*\* = 2½ inch extruder
\*\*\* = 3½ inch extruder
V = per square inch per second Similar beneficial and advantageous results are achieved when the foregoing procedure is repeated with a polymer of 70 weight percent styrene and 30 weight percent acrylonitrile; 80 weight percent styrene and 20 weight percent methyl methacrylate; polyvinyl toluene; a copolymer of 90 weight percent styrene and 10 weight percent α-methylstyrene; poly-o-chlorostyrene, and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. In a method for the preparation of foamed beads of synthetic resinous thermoplastic material from a foamable, extrudable synthetic thermoplastic resinous composition wherein the resinous composition is intermittently extruded in a heat plastified form, the composition comprising a synthetic thermoplastic resinous composition which is extrudable and foamable, the resinous composition being intermittently extruded under continuously applied pressure through a plurality of constricted passageways by a valving means into a plurality of open outlets in a zone of lower pressure to provide a plurality of closely adjacent sequentially extruded globules, the improvement which comprises permitting in said zone of lower pressure the sequentially extruded globules of the composition in closely adjacent relationship to expand and cause the globules to thereby adhere together to form strands, the strands consisting essentially of a plurality of foamed particles adhered together, and subsequently applying mechanical agitation to said strands sufficient to separate the strands into individual particles.

2. The method of claim 1 wherein the mechanical agitation is applied by turbulent air.

3. The method of claim 1 wherein mechanical agitation is applied by means of a centrifugal blower.

4. The method of claim 1 wherein the synthetic resinous composition is an alkenyl aromatic resin.

5. The method of claim 4 wherein the alkenyl aromatic resin is a styrene polymer.

6. The method of claim 5 wherein the styrene polymer is polystyrene.

7. In a method for the preparation of foamed beads of synthetic thermoplastic alkenyl aromatic resinous compositions from a foamable, extrudable synthetic thermoplastic resinous composition wherein the resinous composition is intermittently extruded in a heat plastified form as a plurality of sequentially extruded globules, the composition comprising a synthetic thermoplastic resinous composition of alkenyl aromatic resin which is extrudable and foamable, wherein the alkenyl aromatic resin comprises in chemically combined form at least 50 percent by weight of at least one alkenyl aromatic compound having the general formula

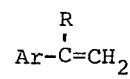

wherein Ar represents an aromatic hydrocarbon radical or a halohydrocarbon radical of the benzene series, and R is hydrogen or the methyl radical with minor amounts of other readily copolymerizable olefinic compounds, the resinous composition being intermittently extruded as closely adjacent globules under continuously applied pressure through a plurality of constricted passageways by a valving means into a plurality of open outlets in a zone of lower pressure, the improvement which comprises permitting in said zone of lower pressure the sequentially extruded globules of the composition in closely adjacent relationship to expand and cause the globules to thereby adhere together to form strands, the strands consisting essentially of a plurality of foamed particles adhered together, and subsequently applying mechanical agitation to said strands sufficient to separate the strands into individual particles. composition comprises globules separate 8. In a method for the preparation of foamed beads of synthetic thermoplastic polystyrene resinous compositions from a foamable, extrudable synthetic thermoplastic polystyrene resinous composition wherein the resinous composition is intermittently extruded in a heat plastified form as a plurality of sequentially extruded globules, the composition comprising a synthetic thermoplastic resinous compostion of polystyrene which is extrudable and foamable, the polystyrene composition being intermittently extruded under continuously applied pressure through a plurality of constricted passageways by a valving means into a plurality of open outlets in a zone of lower pressure, the improvement which compries permitting in said zone of lower pressure the sequentially extruded globules of the composition in closely adjacent relationship to expand and cause the blobules to thereby adhere together to form strands, the strands consisting essentially of a plurality of foamed particles adhered together, and subsequently applying mechanical agitation to said strands sufficient to separte the strands into individual particles.

* * * * *